Feb. 24, 1970     H. DEMNER     3,496,589

DOG SHAMPOO DEVICE

Filed Nov. 7, 1966

INVENTOR.
HOWARD DEMNER
BY
Abner Sheffer
ATTORNEY

United States Patent Office 3,496,589
Patented Feb. 24, 1970

3,496,589
DOG SHAMPOO DEVICE
Howard Demner, 81—55 255th St.,
Floral Park, N.Y. 11004
Filed Nov. 7, 1966, Ser. No. 592,501
Int. Cl. *A01k 29/00; A47k 7/03; B08b 1/00*
U.S. Cl. 15—104.93                                   7 Claims

ABSTRACT OF THE DISCLOSURE

A dog shampoo device comprising flexible rubbery polyurethane foam impregnated with insecticidal dog shampoo composition which is substantially non-irritating to dogs' eyes. The cells of the foam have been broken by drastic compression whereby the cells are open. The shampoo composition is carried in the open cells.

---

Dog shampoos

This invention relates to dog shampoos and to their use.

While insecticidal dog shampoos are currently available, their use has several disadvantages. They are generally supplied in diluted form in glass containers, which are cumbersome to handle and likely to be broken or tipped over by an active dog during shampooing, putting the dog and the person applying the shampoo in danger. In addition, it is difficult to control the quantity of shampoo applied to the dog's fur, and a brush is needed for working the shampoo into the fur. Another disadvantage is that once the container is opened, the shampoo can be contaminated readily.

It is an object of this invention to provide a new and improved form of dog shampoo material. Other objects of this invention will be apparent from the following detailed description and claims.

One aspect of the invention comprises a flexible, rubbery polyurethane foam impregnated with an insecticidal dog shampoo composition which is substantially nonirritating to dogs' eyes.

One form of the invention is illustrated in the accompanying drawing, in which.

In a preferred form, the polyurethane pad is substantially flat, having a thickness of about ½ inch (e.g. about ⅜–¾ inch), the surface of the impregnated pad, prior to use, is dry to the touch; the length and width of the pad are such that it can be held easily in the hand (e.g. about 5 to 7 inches long and about 2½ to 4 inches wide). Also, in this preferred form of the invention, at least one of the two main surfaces (e.g. the upper surface) of the pad is colored with a non-toxic ink of such nature and so bonded to the polyurethane, that the ink is substantially unaffected (in the sense that it does not bleed or run) by the dried shampoo components in the pad, by the shampoo foam produced by wetting of the pad with water, and by the vigorous squeezing and rubbing of the pad surfaces during the actual shampooing of the dog. Preferably, the ink is disposed on the surface of the pad in a pattern such as a picture of a dog and the edges of the pad are cut in an irregular, but smooth, configuration to conform to the outline of the dog in that picture;

this irregular configuration not only gives the pad a pleasing and unusual appearance but it also helps, in the use of the pad, by making it more comfortable to grip and handle. The amount of shampoo composition contained in each pad is sufficient for the shampooing of an average size hairy dog such as a full grown springer spaniel or poodle; the preferred form of the pad is intended for a single use and disposal, so that a fresh, uncontaminated pad is used for each shampooing.

Figure 2:
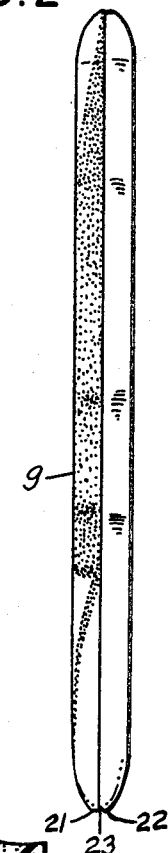
FIG. 2 is a side view of the pad of FIG 1, also drawn to scale.

In a preferred process for the manufacture of the pad, there is employed a thin flexible sheet (e.g. about ½ inch in thickness) of a high density polyurethane foam (e.g. having a density in the range of about 1½ to 2, preferably about 1.6 to 1.8 lbs./cu.ft. and having, for example, about 50–100 pores per square inch). One such foam is the soft polyurethane product, made of a rubbery polyester polyurethane and having about 70 pores to the square inch and a substantially uniform closed cell structure, sold under the designation P–1461 by the General Foam Corporation. In the manufacture of the shampoo pad from such sheet material (illustrated schematically in FIG. 2) the upper surface of the sheet material is colored in the desired pattern 9, as by silk screening, and the material is then fed through driven calendering rollers 11, 12, 13, (rotating in the direction shown by the arrows) set closely together so as to compress the material drastically and break its cells so that its pores are now open. In a preferred form, there is a lower roll 11 and a pair of spaced upper rolls 12, 13, whose outer surfaces are spaced a short distance (e.g. about ⅟₆₀ inch) from the outer surface of the lower roll. One or both of the calendar rolls carries a film of the shampoo composition in a volatile diluent, such as water, so as to bring the composition into close contact with the compressed material in the nip between the rolls, whereby there is obtained a thoroughly impregnated sheet having the diluted composition in its open pores when the material re-expands (to a thickness on the same order as its original thickness) on leaving the nip. To this end, the lower roll 11 may be in contact with a fountain 15 (similar to that of a printing press) containing a diluted mixture of non-irritating shampoo surfactant and insecticide, e.g. of the following composition:

25% of an amphoteric surfactant, non-irritating to skin and eyes, of the formula

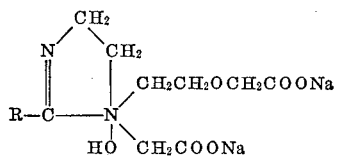

where R—C— is the residue of a higher fatty acid of the formula R—COOH, specifically the fatty acid of coconut oil (i.e. 2-"Cocoyl"-2 imidazolinium hydroxide-1-carboxymethyloxyethyl-1-carboxymethyl disodium salt), 4% of lauric diethanolamide (a foam booster), 0.05% pyrethrins, 0.1% technical piperonyl butoxide, 0.16% N-octyl bicycloheptene dicarboximide and a similar small amount of petroleum distillates (the four last named ingredients being supplied in admixture, as Pyrocide–5192) and the balance water.

Both rolls may be of smooth stainless steel.

The impregnated sheet carrying about 1–1½ times its original weight of the aqueous impregnant, then passes through a dryer (e.g. of the usual temperature-controlled hot air type) 16 where at least the major portion of the aqueous diluent is evaporated off, leaving the surface of the sheet dry to the touch.

When the aqueous shampoo mixture described above is placed on a non-porous surface and dried, to remove its water and other volatile constituents (e.g. petroleum distillates) a soft solid material remains. In the dried impregnated foam, this solid deposit is not visible to the unaided eye, and the impregnated foam remains porous and resilient. A typical impregnated sheet, after drying, carries in the neighborhood of ⅓, based on the weight of polyurethane prior to impregnation, of the dried shampoo material (e.g. the shampoo ingredients constitute about 20 to 30% the total weight).

In the silk-screening of the sheet in the desired pattern, there is preferably used a non-toxic ink for polyurethane, in such manner that the ink becomes tightly bonded to the polyurethane. An example of such an ink is a cellulose nitrate lacquer containing castor oil as a plasticizer, an inert neutral inorganic pigment (such as earth brown), and esters and alcohols as its volatile solvents, e.g. Polyurethane Sponge Burnt Umber Lacquer #C–13681 of Union Ink Co., which ink (when dried) is free of toxic ingredients. The ink is preferably applied to the top side of the sheet (that is, to the side opposite the one directly contacted during the impregnation step, by the film of shampoo composition); it is then air-dried.

Figure 1:
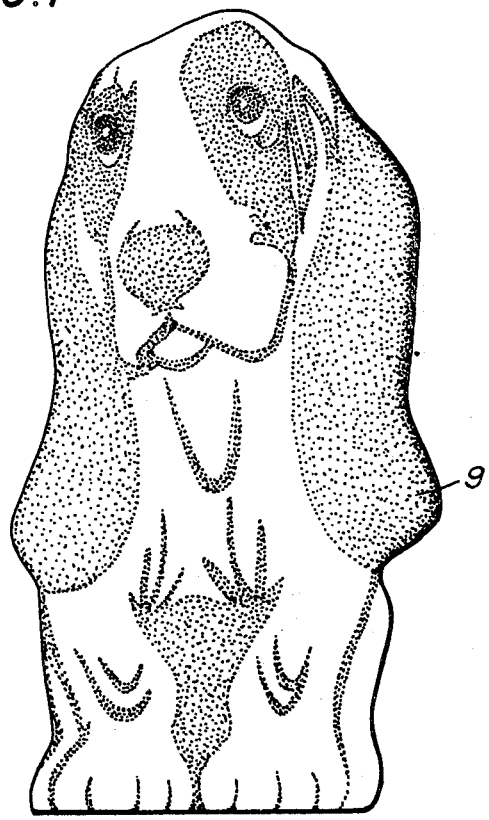
FIG 1 is a plan view of a polyurethane foam pad of this invention, drawn to scale and, in this case, having the outline and imprint of a picture of a basset hound.
Figure 3:
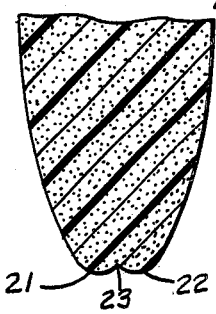
FIG. 3 is a view, broken away, of the edge construction of the pad.
Figure 4:
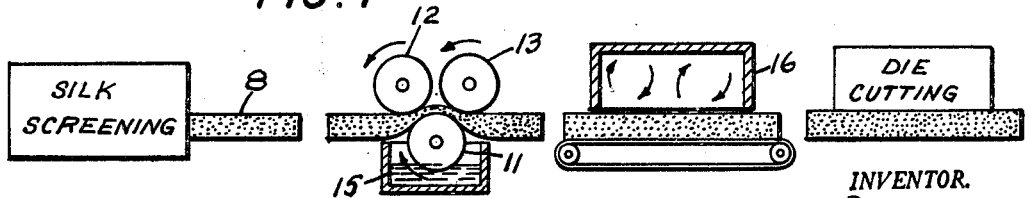
FIG. 4 is a diagrammatic view of the process for making the pad.

After impregnation with the shampo ingredients (and preferably after drying thereof) the sheet is die cut in registry with the silk-screened image (as shown in FIG. 1). The polyurethane foam is of the type (i.e. "non-clickable") which, under the die-cutting conditions, becomes tightly compressed and fused at the line of cutting, so that the cut pad has a smooth tapered edge (FIG. 3) comprising mainly the uncut upper and lower surfaces (21 and 22 respectively) of the sheet material joined by a very thin line 23 (e.g. ¹⁄₁₀₀ inch or less in thickness) of the fused cut foam. It is found that the presence of the dried shampoo in the sheet material does not interfere with this fusing action and that the known die-cutting conditions, using hot dies which fuse the foam, may be employed. The die temperature may be about 400° F., for example.

A suitable temperature for drying the impregnated foam is, for example, about 250° F.

When the user wets the finished pad with water and rubs it against the fur and skin of the dog, the pad releases a liquid insecticidal shampoo foam and, on continued re-wetting and further rubbing, a surprisingly large additional amount of this foam is generated. The foam comprises ingredients which are approved by the U.S. Food and Drug Administration for use on dogs.

For distribution, the shampoo pads are preferably packed in a sealed bag of transparent film, preferably of a moisture-resistant type such as polypropylene.

The product is very conveniently and easily used for shampooing of dogs; it provides a high degree of dispersion of the active ingredients; it is light in weight and economical to manufacture and thus disposable after a single use; and it avoids the disadvantages of conventional dog shampoos as described above.

It will be understood that other non-irritating surfactants may be used in place of the particular imidazolinium compound described above, especially other amphoteric detergents (e.g. the 2-nonyl or 2-undecyl- imidazolinium hydroxide - 1 - carbomethyloxy - 1 - hydroxyethyl sodium salts).

In the embodiment illustrated in the drawing, the pad is about 6 inches long and about 3¼ inches wide, has a weight (after impregnating and drying) of about 4.7 grams; prior to impregnation the weight of the same size of the silk-screened polyurethane is about 3.5 grams.

What is claimed is:

1. A dog shampoo device comprising a substantially flat, thin flexible pad of flexible foam of polyurethane rubber whose substantially uniform closed cells have been broken by drastic compression, said foam being impregnated with an insecticidal shampoo composition which is substantially non-irritating to dogs' eyes, said shampoo composition being carried in the open cells of said foam and said pad being dry to the touch.

2. A device as in claim 1 in which at least one of the two main surfaces of the flat pad is colored in a pattern with a non-toxic ink bonded to the polyurethane so as to be substantially unaffected by said shampoo and by the vigorous squeezing and rubbing of the pad during the shampooing of the dog.

3. A device as in claim 2, in which the polyurethane is a soft polyester polyurethane weighing about 1½ to 2 lbs./cu. ft., with about 50–100 pores per square inch, said pad carrying in its pores about 20 to 30% of solid dried insecticidal shampoo composition comprising an amphoteric surfactant.

4. A device as in claim 3 in which the amphoteric surfactant is a 2-higher alkyl-2-imidazolinium hydroxide-1-carboxymethyloxyethyl-1-carboxymethyl disodium salt.

5. A device as in claim 4, in which said pad is about ⅜ to ¾ inch thick, about 5 to 7 inches long and about 2½ to 4 inches wide and is of polyurethane rubber whose substantially uniform closed cells have been broken by drastic compression, said impregnated pad being dry to the touch, said ink being a plasticized cellulose nitrate lacquer, said composition comprising insecticidal pyrethrins, said pad having tapered edges whose surfaces comprise bent portions of uncut upper and lower surfaces of the polyurethane foam pad, said surfaces being joined by a thin fused line of the same soft rubbery polyurethane.

6. A device as in claim 1 in which said pad has tapered edges whose surfaces comprise bent portions of uncut upper and lower surfaces of the polyurethane foam pad, said surfaces being joined by a thin fused line of the same soft rubbery polyurethane.

7. A device as in claim 1 in which the edges of the pad are tapered and comprise a thin line of a fused soft rubbery polyurethane material.

References Cited

UNITED STATES PATENTS

| | | | |
|---|---|---|---|
| 1,614,019 | 1/1927 | Pratt | 15—244.1 |
| 2,591,481 | 4/1952 | Webster | 15—506 |
| 2,942,285 | 6/1960 | Gray | 15—209 |
| 3,002,937 | 10/1961 | Parker et al. | 15—506 XR |
| 3,112,219 | 11/1963 | Politzer et al. | 15—506 XR |
| 3,171,820 | 3/1965 | Volz. | |
| 3,088,158 | 5/1963 | Boyle et al. | 15—506 |
| 3,283,357 | 11/1966 | Decker et al. | 15—104.93 |

FOREIGN PATENTS

| | | |
|---|---|---|
| 179,882 | 7/1962 | Sweden. |
| 396,336 | 4/1963 | Switzerland. |

OTHER REFERENCES

"Polyurethanes on the Way," Modern Plastics, August 1955, vol. 32, #12, pp. 102, 103, 104, 15–244.

Veterinary Drug Encyclopedia and Therapeutic Index, 13th ed., published by The Reuben H. Donnelley Corp., copyright 1965, received Scientific Library, Mar. 7, 1966—Copy in Gr. 120, p. 63 relied upon.

The Miranol Chemical Company Inc., publication titled Technical and Product Development Data, pp. 24, 25 and 26 relied upon, received in Div. 64 on April 1958. Copy in 252-89.

WALTER A. SCHEEL, Primary Examiner

ROBERT I. SMITH, Assistant Examiner

U.S. Cl. X.R.

252—91; 401—261